Nov. 26, 1929.    F. P. HATCH    1,737,236
DEMOUNTABLE RIM
Filed Nov. 15, 1928
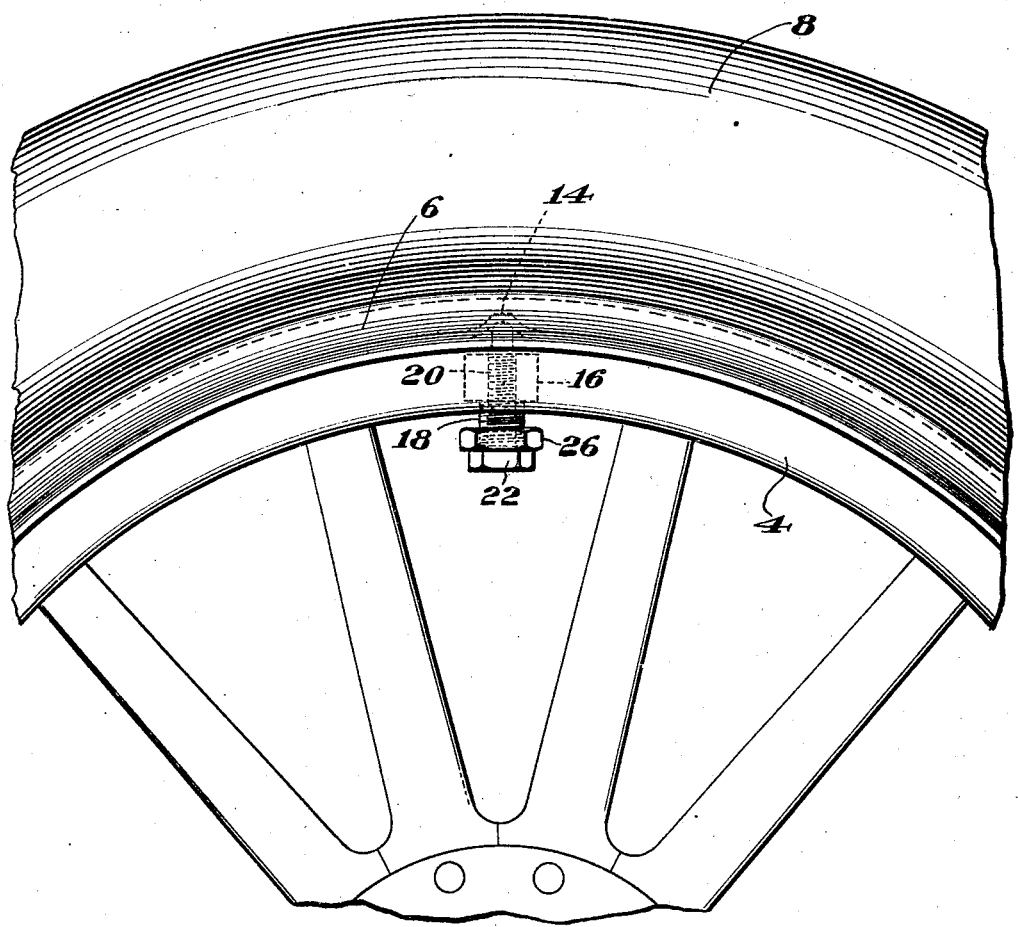
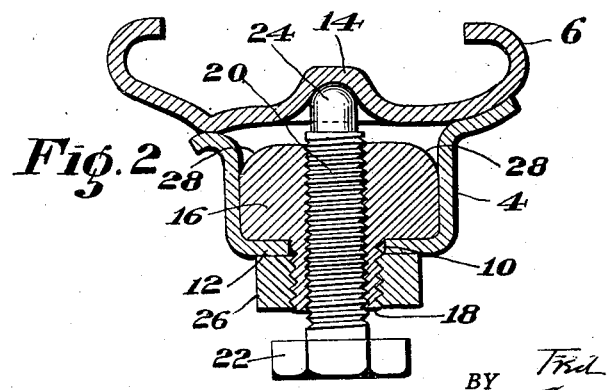
INVENTOR
Fred P. Hatch
BY
his ATTORNEY Patented Nov. 26, 1929

1,737,236

UNITED STATES PATENT OFFICE

FRED P. HATCH, OF WOLLASTON, MASSACHUSETTS

DEMOUNTABLE RIM

Application filed November 15, 1928. Serial No. 319,554.

This invention relates to devices for securing rims for pneumatic tires upon vehicle wheels and more particularly to key mechanism for locking a demountable rim to the felly of the wheel.

One object of the invention is to provide a key mechanism for demountable rim locks that can be mounted on the wheel without any machining of either the wheel felly or rim for the tire. A further object is to produce a key mechanism for demountable rim locks composed of a minimum number of parts, yet adapted to co-operate with a rim in a manner effectually to prevent circumferential creeping, thus ensuring safety while affording cheapness of manufacture. A still further object is to provide a demountable rim lock that does not require removal of any part from the wheel when manipulating it to remove a tire, thus preventing loss of any part of the device and, as a corollary to this, a key mechanism that is effectually retained as a whole on the wheel after the removal of a tire. Additional objects are to produce a demountable rim lock of extreme simplicity so as to render it "fool proof," and generally to improve on the reliability, strength and effectiveness of similar devices now in use.

To the accomplishment of these objects the invention comprises the features and combinations of parts hereinafter described and then particularly pointed out in the appended claim.

The preferred form of the invention is illustrated in the accompanying drawing, in which:

Figure 1 shows a portion of a pneumatic tired wheel, with one of the demountable rim locks of this invention set in rim locking position; and Fig. 2 shows a view, in sectional elevation, of one of the improved key mechanisms and a rim, the parts being shown in position with the locking bolt set home.

In the embodiment of the invention illustrated in the drawing of the wheel, of any construction, has the usual channeled felly 4 for supporting a tire rim 6 which is shaped as usual except for a detail presently described, and a pneumatic tire 8. The locking devices are of the radial type, as contrasted to the lateral wedge type now generally in use, and their key mechanisms are seated in a series of circular holes 10 (Fig. 2) spaced at intervals along the inner peripheral surface of bottom 12 of the channeled felly. The rim 6 is provided with a series of crater-like recesses 14 at its under side equal in number to the holes 10 and spaced so that the rim may be set on the felly with a recess opposite each hole.

Each key mechanism has a member adapted to seat in a hole 10 to lock the rim to the felly, but since all the devices are alike a description of one will suffice. Within the felly channel is an anti-twist or steady block 16 having a width permitting it to seat loosely but non-rotatably within the trough of the felly and provided with a cylindrical neck 18 which projects inwardly through a felly hole 10. The block has a threaded central bore for receiving a threaded bolt 20 having a hexagonal or other suitable head 22 and an unthreaded end 24 shaped to enter a rim recess 14. The neck 18, outside the felly is threaded for receiving a nut 26 conveniently of the same shape as the bolt head. The threads on the neck and nut 26 have a greater pitch than the threads within the block and on the bolt 20 for a purpose explained hereinafter.

In replacing a tire the operator first sees that all the bolts 20 are backed off until their smooth ends are within the circle of the rim and preferably that all the nuts 26 are against the under side of the felly, as shown in Fig. 2, to completely house the blocks 16 in the channel of the felly. To guard against difficulty in setting the rim on the wheel felly, should one or more nuts 26 not have been screwed up to the felly thus permitting a block 16 to project out of the felly channel, these blocks are provided with rounded or beveled lateral edges 28. These beveled side edges form inclined shoulders over which the rim will slide if engaged in its movement across the felly, thus forcing the block into its correct position deep within the felly channel. After the rim has been placed on the felly the bolts 20 are screwed home into the rim recesses 14 thus locking the rim against both lateral displacement and circumferential creeping. Finally the nuts 26 are backed off and seated tight against the under faces of the bolt heads 22 to lock the bolts against loosening (see Fig. 1). The purpose of having the threads of greater pitch on the neck 18 than on the bolt 20 will now be apparent. If constant vibration should cause the threaded parts to turn in a direction to loosen them the nut 26 will always turn off faster than does the bolt 20 which it locks, and thus continually re-establish its locking function. The reverse operations permit the rim to be removed for changing a tire.

It will be understood from the foregoing that the nuts 26 perform the double function of locking the bolts and providing means for preventing loss of the blocks 16 out of the felly. The manipulation of the key mechanisms in either removing or replacing the rim does not require the removal of any part thereof from the wheel with its consequent possible loss or damage. An adjustable ratchet wrench of handy size is the only tool required. Especial attention is called to the fact that three simple made parts constitute the key mechanism and no machining is required on either the felly or rim.

The nature and scope of the invention having been indicated and its preferred embodiment having been specifically described, what is claimed as new, is:—

A wheel having a tire-rim and a channel metal felly having an opening in the bottom wall of the channel, a steady-block mounted non-rotatably in the channel having an externally-threaded neck extending through said opening in the rim, said steady-block and neck having a threaded bore extending through them, the thread of this bore having a lesser pitch than the aforesaid thread on the external surface of the neck, a threaded bolt extending through said neck and steady-block and having a projecting outer end adapted to engage the tire-rim, said bolt being provided with a head adjacent the end of said neck, and a nut screwed on said neck adapted in one position to engage the inner face of the rim to thus hold the steady-block down in the channel and in another position to bind against the adjacent face of the bolt-head to thereby lock the bolt against loosening.

FRED P. HATCH.